United States Patent
Iwatare

[19]

[11] Patent Number: 6,060,191

[45] Date of Patent: May 9, 2000

[54] CASING FOR A BATTERY

[75] Inventor: Misao Iwatare, Tokyo, Japan

[73] Assignee: NEC Corporation, Tokyo, Japan

[21] Appl. No.: 09/053,636

[22] Filed: Apr. 2, 1998

[30] Foreign Application Priority Data

Apr. 2, 1997 [JP] Japan .................................... 9-083698

[51] Int. Cl.⁷ ................................................ H01M 2/12
[52] U.S. Cl. ................................ 429/53; 429/72; 429/82; 429/175
[58] Field of Search ................................ 429/53, 72, 78, 429/82, 148, 163, 175, 176

[56] References Cited

U.S. PATENT DOCUMENTS 3,802,597  4/1974  Miller ...................................... 136/170

4,338,383  7/1982  Jutte et al. ................................ 429/88

*Primary Examiner*—Maria Nuzzolillo
*Assistant Examiner*—Monique Wills
*Attorney, Agent, or Firm*—Scully, Scott, Murphy & Presser

[57] ABSTRACT

A casing for a battery of the present invention is made up of a top-open box and a lid closing the open top of the box. The lid has a pyramidal top portion formed with a plurality of vent holes for allowing a gas to pass therethrough. A polymeric osmotic film allowing a gas to pass therethrough, but intercepting water, is fitted in each of the vent holes. The casing therefore vents hydrogen output from a battery while preventing water from entering it.

2 Claims, 4 Drawing Sheets

CASING FOR A BATTERY

BACKGROUND OF THE INVENTION

The present invention relates to a battery for feeding power to, e.g., a communication apparatus located outside of a station building or inside of an unmanned station building.

A communication apparatus installed in a station building has customarily been fed by a power source available in the building or by a back-up battery. The battery installed in the building does not need a waterproof or similar specific implementation. In addition, hydrogen gas output from the battery is driven out of the building by, e.g., a fan.

A current trend is, however, toward a small size station building or a casings to be mounted on a pole due to the increasing ground rent, extending transmission distance, and expanding subscriber services. While such a building or casing usually receives power from an electric cables in order to feed a communication apparatus, it is loaded with a battery in case of power failure. Because the battery itself is situated outdoors, the casing is provided with a waterproof structure. The casing must be provided with a vent hole for venting hydrogen gas output from the battery. The vent hole may be formed in the bottom of the casing. However, the problem is that the vent hole admit dust and insects into the casing.

SUMMARY OF THE INVENTION

It is therefore an object of the present invention to provide a casing capable of venting hydrogen gas output from a battery stored therein even when the casing is situated outdoors.

It is another object of the present invention to provide a casing for a battery capable of being formed with vent holes without having its waterproof feature deteriorated.

It is still another object of the present invention to provide a casing capable of smoothly venting hydrogen gas output from a battery stored therein.

It is a further object of the present invention to provide a casing for a battery capable not only of intercepting outside water, but also of preventing dust and insects from entering it.

In order to achieve the above objects, a casing for a battery for an outdoor communication apparatus of the present invention is made up of a top-open box and a lid openably closing the open top of the box. The lid has a pyramidal configuration and is formed with a plurality of vent holes. A polymeric osmotic film for venting hydrogen gas produced in the casing, but intercepting outside water tending to enter the casing, is fitted in each of the plurality of vent holes.

BRIEF DESCRIPTION OF THE DRAWINGS

The above and other objects, features and advantages of the present invention will become apparent from the following detailed description taken with the accompanying drawings in which.

Figure 1:
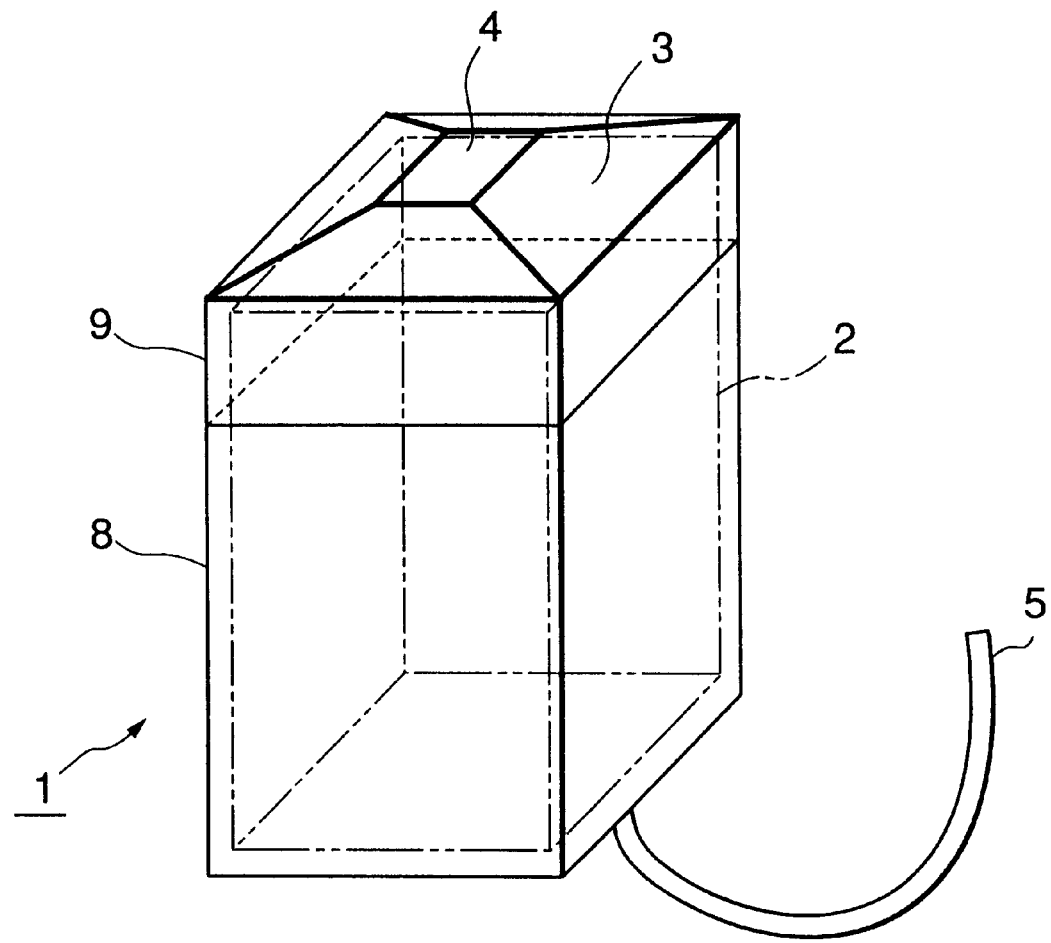
FIG. 1 is a perspective view showing a battery casing embodying the present invention.

In the drawings, identical references denote identical structural elements.

DETAILED DESCRIPTION OF THE PREFERRED EMBODIMENT

Figure 2:
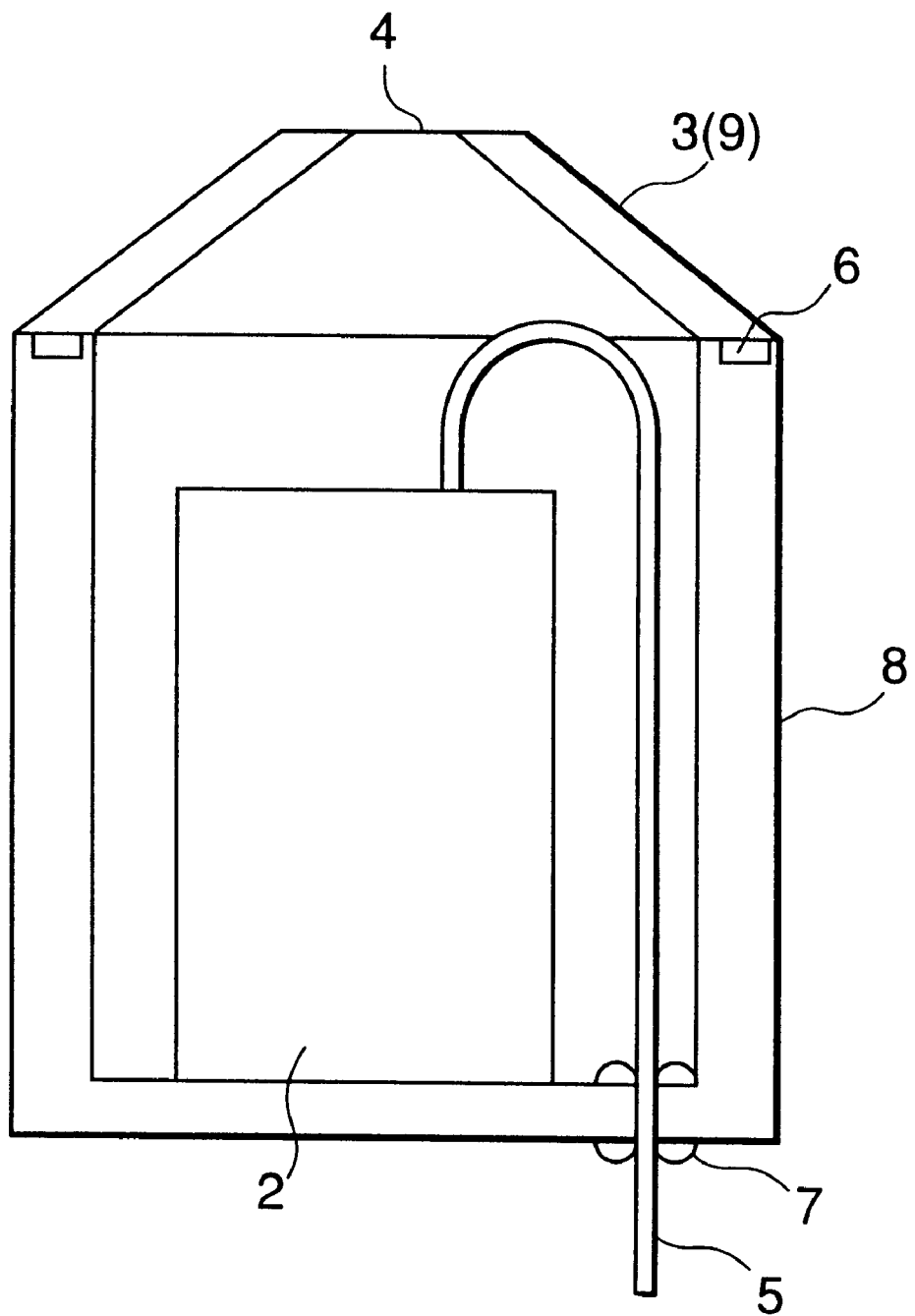
FIG. 2 is a section of the illustrative embodiment.

Referring to FIGS. 1 and 2, a casing for a battery embodying the present invention is shown and generally designated by the reference numeral 1. As shown, the casing 1 is made up of a top-open box 8 and a lid 9 openably closing the open top of the box 8. A battery 2 is received in the box 8 in such a manner as to be removable for replacement. A packing 6 provides the box 8 and lid 9 with a liquid-tight structure. A power supply cable 5 is affixed to the bottom of the box 8 by a waterproof member 7. The lid 9 has a pyramidal top portion 3 formed with a plurality of vent holes, not shown, which allow a gas to pass therethrough. A polymeric osmotic film, not shown, is fitted in each of the vent holes. The osmotic film allows a gas generated inside of the casing 1 to pass therethrough, but intercepts outside water tending to enter the casing 1.

In the above configuration, hydrogen gas output from the battery 2 is collected in the pyramidal top portion 3 of the lid 9 via the open top of the box 8. As a result, the hydrogen gas is smoothly discharged to the outside of the casing 1 via the osmotic films of the lid 9 because it is lighter than air. Further, the osmotic films prevent outside water from entering the casing 1, so that the casing 1 is fully waterproof. In addition, such films prevent dust and insects from entering the casing 1.

Figure 3:
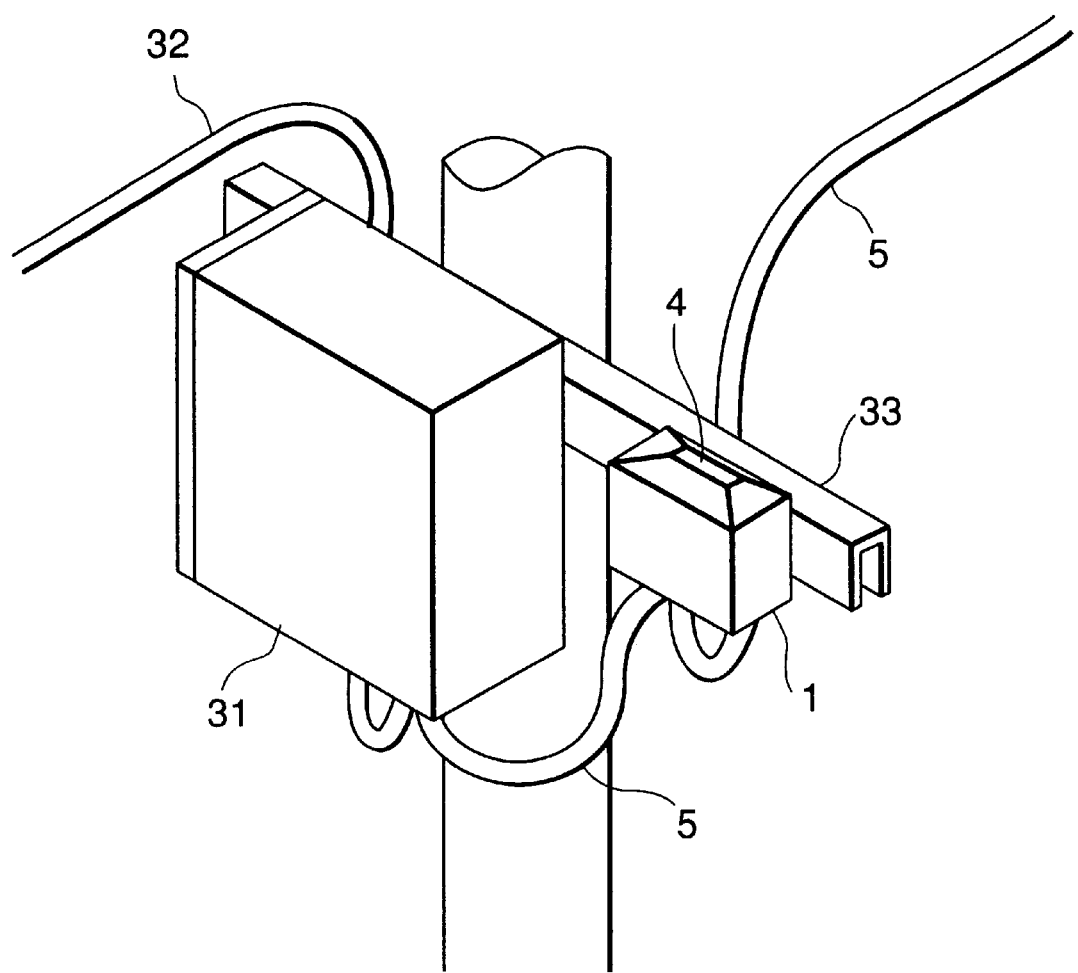
FIG. 3 is a perspective view showing a specific application of the illustrative embodiment.
Figure 4:
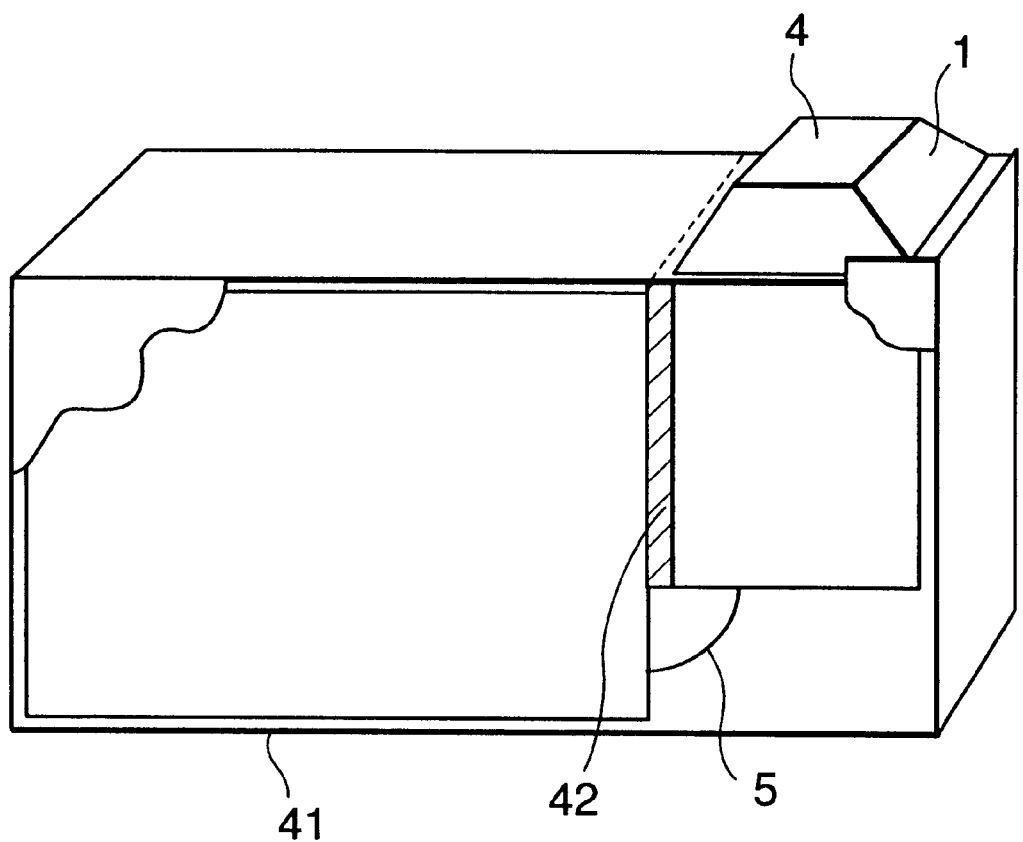
FIG. 4 is a perspective view showing another specific application of the illustrative embodiment.

FIG. 3 shows a specific application of the casing 1. As shown, the casing 1 is fixed in place independently of a communication apparatus 31. FIG. 4 shows another specific application of the casing. FIG. 4 shows another specific application of the casing 1. As shown, the casing 1 is received in a communication apparatus 41 with the intermediary of a rubber packing 42 fitted on the casing 1.

In summary, it will be seen that the present invention provides a casing for a battery capable of preventing not only water but also dust and insects from entering it.

What is claimed is:

1. A casing for accommodating a battery for an outdoor communication apparatus, comprising a top-open box and a lid removable from and covering an open top of said box, said lid being formed with a plurality of vent holes, each of said plurality of vent holes being fitted with a polymeric osmotic film for venting a gas produced in said casing, while preventing outside water from entering said casing.

2. A casing as claimed in claim 1, wherein said lid has a pyramidal configuration.

* * * * *